(12) United States Patent
Song et al.

(10) Patent No.: US 12,238,606 B2
(45) Date of Patent: Feb. 25, 2025

(54) METHOD FOR V2X SERVICE, AND SERVER USING SAME

(71) Applicant: LG ELECTRONICS INC., Seoul (KR)

(72) Inventors: Min Song, Seoul (KR); Kwangsik Kong, Seoul (KR); Seongwoo Jeong, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 347 days.

(21) Appl. No.: 17/776,887

(22) PCT Filed: May 19, 2020

(86) PCT No.: PCT/KR2020/006535
§ 371 (c)(1),
(2) Date: May 13, 2022

(87) PCT Pub. No.: WO2021/235567
PCT Pub. Date: Nov. 25, 2021

(65) Prior Publication Data
US 2022/0408214 A1    Dec. 22, 2022

(51) Int. Cl.
*H04W 4/021*    (2018.01)
*H04W 4/12*    (2009.01)
*H04W 4/40*    (2018.01)

(52) U.S. Cl.
CPC ............ *H04W 4/021* (2013.01); *H04W 4/12* (2013.01); *H04W 4/40* (2018.02)

(58) Field of Classification Search
CPC ......... H04W 4/021; H04W 4/12; H04W 4/40; H04W 88/18; H04L 67/12; H04L 67/55; G08G 1/16
See application file for complete search history.

(56) References Cited

U.S. PATENT DOCUMENTS

2015/0379114 A1* 12/2015 Onishi .................. H04L 65/403
707/737
2017/0074988 A1* 3/2017 Kitchel .............. G01C 21/3844
(Continued)

FOREIGN PATENT DOCUMENTS

CN    107295469 A    10/2017
CN    109874123 A    6/2019
(Continued)

OTHER PUBLICATIONS

3GPP, "3rd Generation Partnership Project; Technical Specification Group Services and System Aspects; Application Layer Support for Vehicle-to-Everything (V2X) Services; Functional Architecture and Information Flows; (Release 16)," 3GPP TS 23.286, V16.3.0, Mar. 24, 2020, XP052297803, pp. 1-64.
(Continued)

*Primary Examiner* — Marisol Figueroa
(74) *Attorney, Agent, or Firm* — Birch, Stewart, Kolasch & Birch, LLP

(57) ABSTRACT

A server for a vehicle-to-everything (V2X) service receives, from a first V2X device, a subscription request for requesting subscription of the V2X service, and sets a subscription area for the first V2X device. The server publishes, to the first V2X device, at least one V2X message published by at least one second V2X device associated with the subscription area.

8 Claims, 13 Drawing Sheets

(56) References Cited

U.S. PATENT DOCUMENTS

| | | |
|---|---|---|
| 2018/0040246 A1* | 2/2018 | Yonemura ............. H04W 4/027 |
| 2018/0156624 A1 | 6/2018 | Bai et al. |
| 2018/0192268 A1 | 7/2018 | Xu et al. |
| 2019/0051188 A1* | 2/2019 | Moustafa ................ H04W 4/90 |
| 2019/0173951 A1 | 6/2019 | Sumcad et al. |
| 2019/0371180 A1 | 12/2019 | Hara et al. |
| 2020/0092691 A1 | 3/2020 | el Essaili et al. |
| 2020/0260239 A1* | 8/2020 | Ahn ..................... G08G 1/0112 |

FOREIGN PATENT DOCUMENTS

| | | |
|---|---|---|
| CN | 110784328 A | 2/2020 |
| KR | 10-1714250 B1 | 3/2017 |
| KR | 10-2019-0017171 A | 2/2019 |
| WO | 2016/013826 A1 | 1/2016 |
| WO | WO2018/100661 A1 | 6/2018 |
| WO | 2020/004767 A1 | 1/2020 |

OTHER PUBLICATIONS

Draft ETSI, "Intelligent Transport Systems (ITS); Framework for Public Mobile Networks in Cooperative ITS (C-ITS)," Draft ETSI TR 102 962, V1.1.5, Aug. 27, 2019, XP014354130, pp. 1-48.

* cited by examiner

FIG. 4
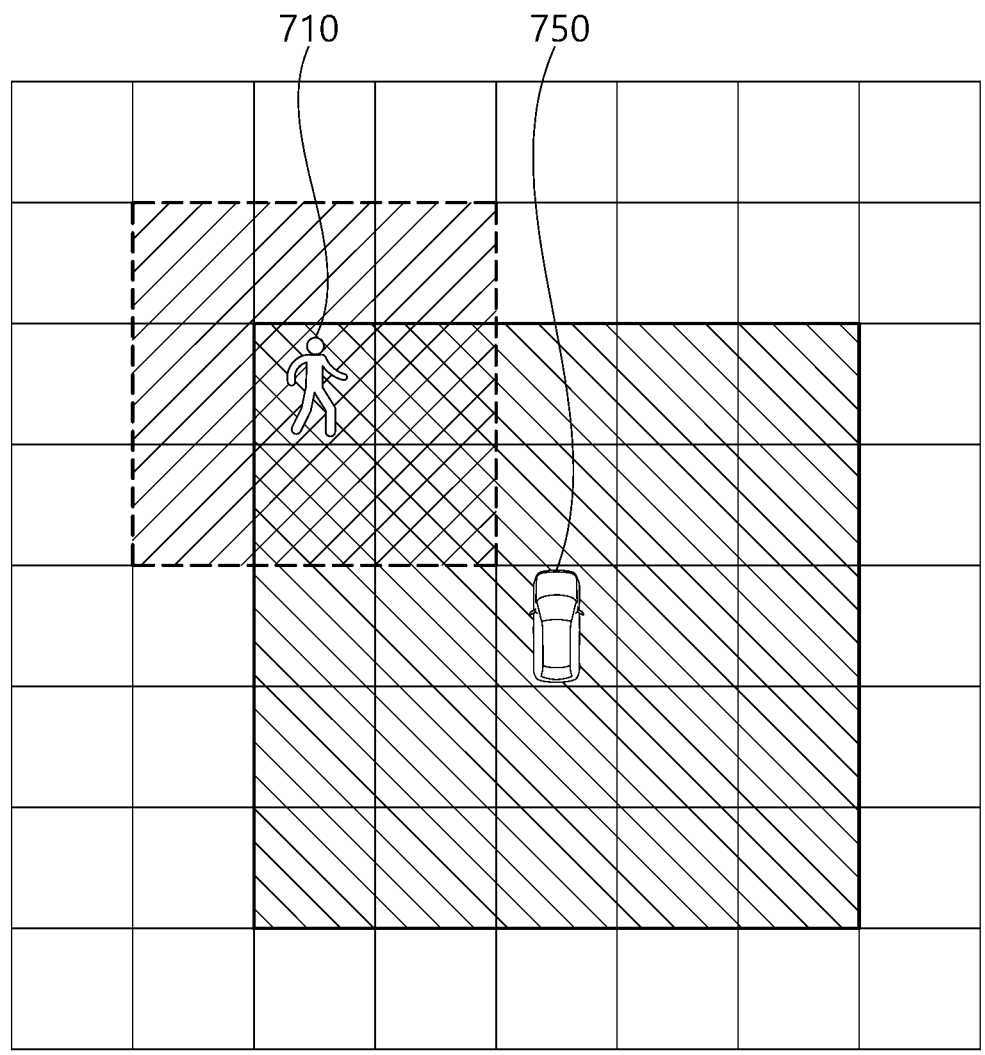
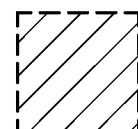 : First Subscription Area
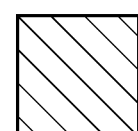 : Second Subscription Area

FIG. 12
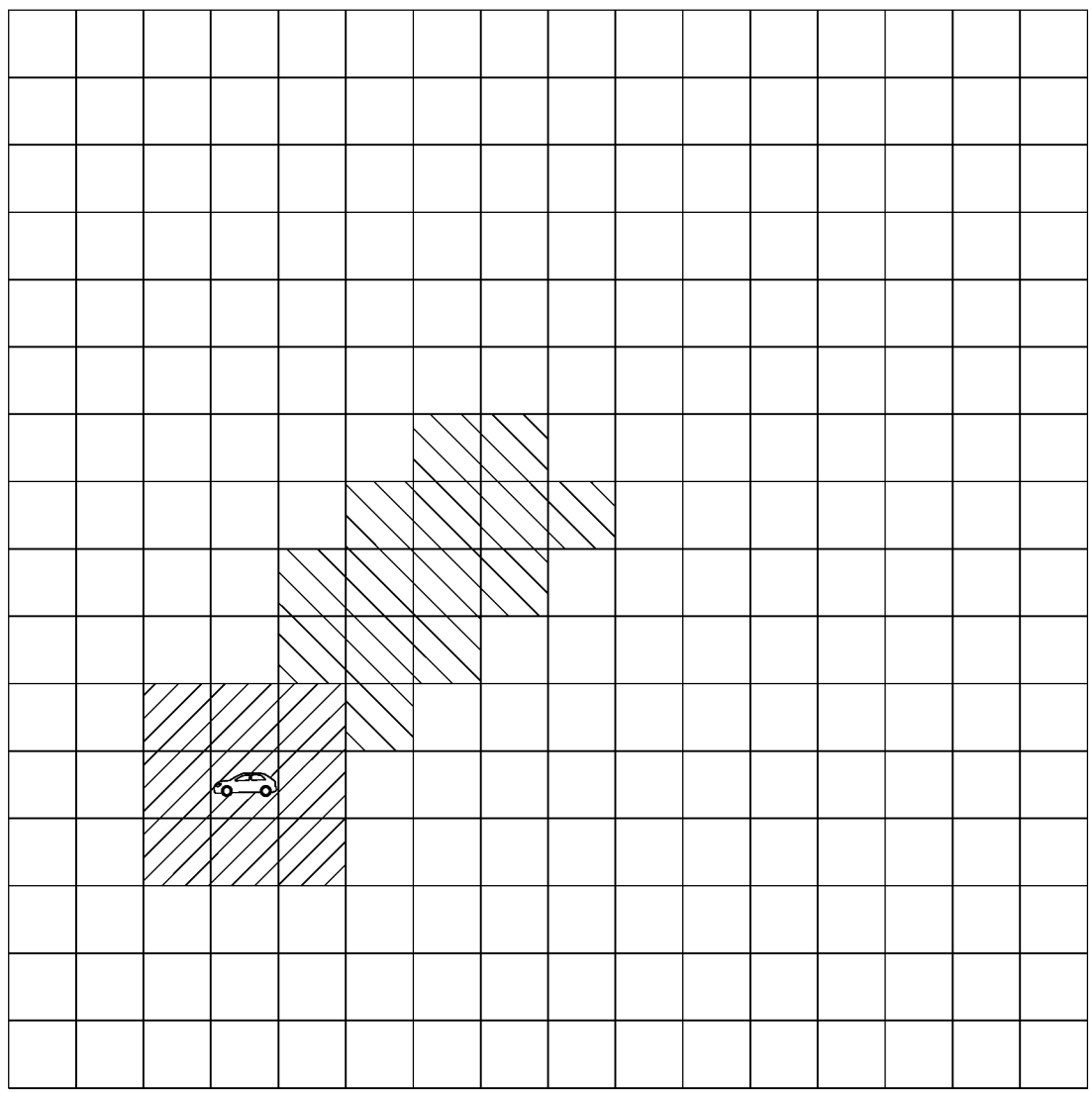
 : Subscription Area     : Additional Subscription Area

METHOD FOR V2X SERVICE, AND SERVER USING SAME

CROSS REFERENCE TO RELATED APPLICATIONS

This application is the National Stage filing under 35 U.S.C. 371 of International Application No. PCT/KR2020/006535, filed on May 19, 2020, the contents of this application are hereby incorporated by reference herein in its entirety.

BACKGROUND OF THE DISCLOSURE

Field

The present disclosure relates to a method for vehicle-to-everything (V2X) service and a server using the same.

Related Art

A vehicle is an apparatus which moves a passenger from one place to another place. A representative example is a car. A vehicle-to-everything (V2X) communication technology, which means vehicle-to-object communication, refers to a technology in which the vehicle communicates with other vehicles, pedestrians, road infrastructures, servers, and the like to provide a series of services.

For the V2X, standardization organizations such as Institute of Electrical and Electronics Engineers (IEEE), 3rd Generation Partnership Project (3GPP), etc. provide various communication specifications. Dedicated Short Range Communications (DSRC) is the communication standard protocol based on IEEE 802.11p. Cellular-V2X (C-V2X) is the communication standard protocol based on cellular communication protocol of 3GPP. In general, V2X has focused on vehicle safety through direct communication between vehicles, but recently V2X includes vehicle-to-infrastructure communication for communicating with peripheral devices via a network.

Attempts are being made to extend V2X technology to be applied to pedestrians and other electronic devices, rather than simply being used for vehicle safety such as vehicle-to-vehicle and vehicle-to-peripheral devices.

SUMMARY OF THE DISCLOSURE

The present disclosure provides relates to a method for vehicle-to-everything (V2X) service and a server using the same.

In an aspect, a server for V2X service includes a processor, and a memory operatively coupled with the processor and configured to store instructions that, when executed by the processor, cause the server to perform functions. The functions comprise receiving a subscription request for requesting a subscription of a V2X service from a first V2X device, configuring a subscription area for the first V2X device, receiving at least one V2X message that is published by at least one second V2X device associated with the subscription area, and publishing the at least one V2X message to the at least one first V2X device.

In another aspect, a method for V2X service includes receiving a subscription request for requesting a subscription of a V2X service from a first V2X device, configuring a subscription area for the first V2X device, receiving at least one V2X message that is published by at least one second V2X device associated with the subscription area, and publishing the at least one V2X message to the at least one first V2X device.

It is possible to provide V2X services to more diverse users and devices, as well as vehicles.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 4 shows an example in which a subscription area is set according to an embodiment of the present specification.

FIG. 12 shows another example in which a subscription area is set according to an embodiment of the present specification.

DETAILED DESCRIPTION OF THE EMBODIMENTS

Figure 1:
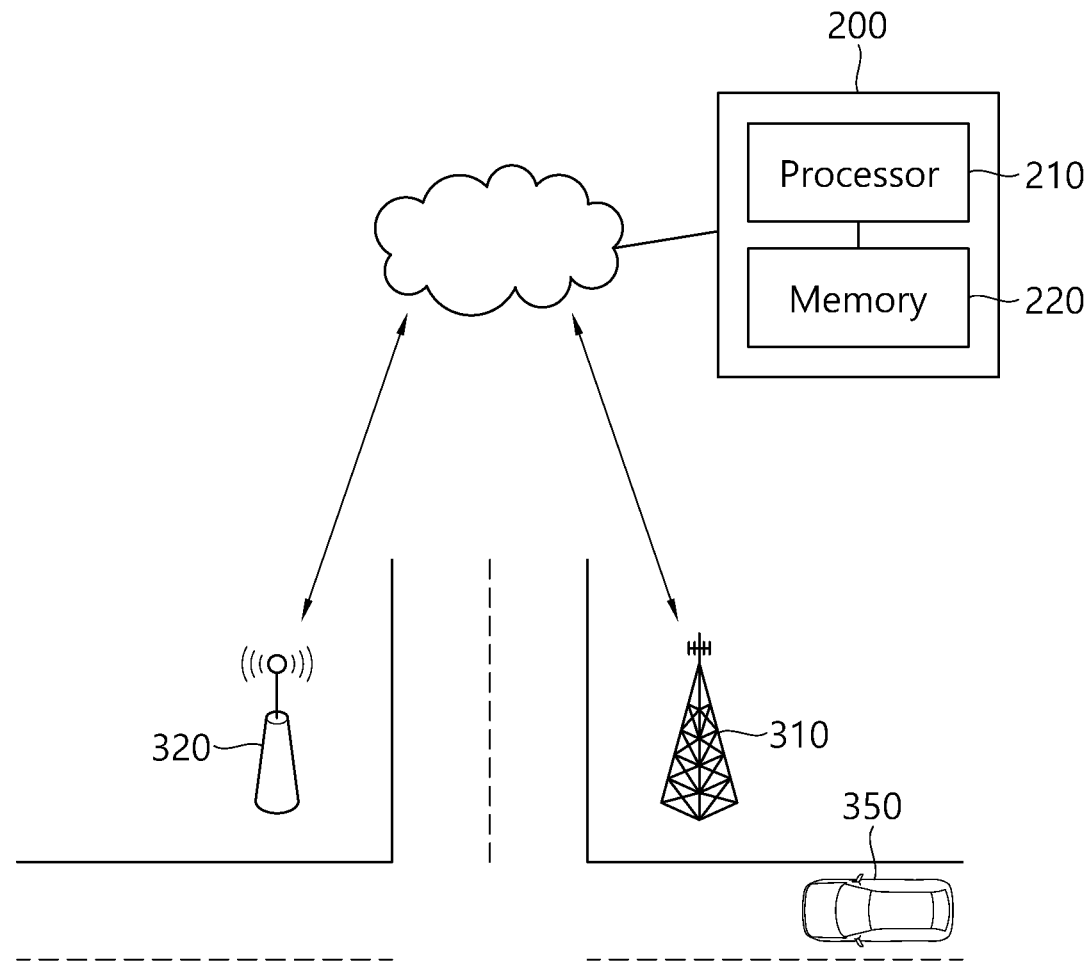
FIG. 1 shows a system to which an embodiment of the present specification is applied.

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies can obscure the gist of the embodiments disclosed in the present specification, the detailed description thereof will be omitted. In addition, the accompanying drawings are only for easy understanding of the embodiments disclosed in the present specification, and the technical ideas disclosed in the present specification are not limited by the accompanying drawings.

Terms including an ordinal number, such as first, second, etc., can be used to describe various elements, but the elements are not limited by the terms. The above terms are used only for the purpose of distinguishing one component from another.

When an element is referred to as being "connected" or "coupled" to another element, it is understood that it can be directly connected or coupled to the other element, but other elements can exist in between. On the other hand, when it is mentioned that a certain element is "directly connected" or "directly coupled" to another element, it should be understood that no other element is present in the middle.

The singular expression includes the plural expression unless the context clearly dictates otherwise.

In the present application, terms such as "comprises" or "have" are intended to designate that the features, numbers, steps, operations, components, parts, or combinations thereof described in the specification exist, but it is to be understood that this does not preclude the possibility of addition or existence of one or more other features, numbers, steps, operations, components, parts, or combinations thereof.

A vehicle according to an embodiment of the present specification can be defined as a means of transport traveling on a road or track. Vehicles can include automobiles, ships, aircraft, trains, motorcycles, bicycles, and the like. The vehicle can include an internal combustion engine vehicle having an engine as a power source, a hybrid vehicle having an engine and an electric motor as a power source, an electric vehicle having an electric motor as a power source, and combinations thereof.

A vehicle-to-everything (V2X) device according to an embodiment of the present specification refers to a device that provides V2X functions and V2X services to users based on software, and is also referred to as a SoftV2X device. The V2X device can be implemented based on hardware and/or software in an electronic device operated by a user such as User Equipment (UE), mobile station (MS), mobile terminal (MT), user terminal (UT), cellular phone, laptop, handheld device, tablet, drone, consumer electronics, and the like. The V2X device can be mounted on a vehicle or electronic device as an on-board unit (OBU) to provide V2X functions and services to the vehicle. A V2X device disposed inside or outside the vehicle can be connected to the vehicle through a wireless interface to provide V2X functions and V2X services to the vehicle.

FIG. 1 shows a system to which an embodiment of the present specification is applied.

A system includes a V2X device 100 and a V2X server 200. The V2X device 100 can communicate with the V2X server 200 through the base station 310 or a Road Side Unit (RSU) 320. The V2X device 100 can communicate with the base station 310, the RSU 320, a neighbor vehicle 350 and/or a neighbor V2X device using a wireless communication protocol. There is no limitation on the wireless communication protocol. The wireless communication protocol can include Dedicated Short Range Communications (DSRC), Cellular-V2X (C-V2X), WiFi, BLUETOOTH and/ or cellular communication protocols based on 3rd Generation Partnership Project (3GPP) (e.g., Wideband Code Division Multiple Access (WCDMA), Long Term Evolution (LTE), New Radio (NR), etc.).

The V2X server 200 receives one or more V2X messages from the V2X device 100 within a managed area. The V2X server 200 can forward the one or more collected V2X messages to the subscribing V2X device 100.

The V2X message can periodically or aperiodically be transmitted to the V2X server 200 by the V2X device 100 (or RSU 320), and is a message providing status information of the V2X device 100 (or device managed by the RSU 320). For example, the V2X device 100 can transmit 10 V2X messages per second. The V2X server 200 collects V2X messages from multiple V2X devices, and forwards the V2X messages to subscribing V2X devices.

The following table shows examples of information elements included in the V2X message. Not all information elements are required, and names are examples only. Information elements can be added/changed/deleted according to policies or circumstances.

TABLE 1

| Name | Description |
| --- | --- |
| V2X ID | A temporary identifier (ID) for identifying the V2X device sending this message. It is randomly selected by the V2X device and can be changed periodically. The size can be 4 octets. |
| Position | Indicates the location of the V2X device. Can contain latitude, longitude and elevation. |
| Position Accuracy | Including the quality of various parameters used to model the accuracy of positioning. |
| Velocity | Indicates the velocity of the V2X device. |
| Heading | Indicates the current heading (direction of motion) of the V2X device. |
| Path History | defines a geometric path reflecting V2X device's movement over some period of time and/or distance |
| Acceleration | Indicates the acceleration of the V2X device. Can include a set of acceleration values for three orthogonal directions of the V2X device: a longitudinal axis, a lateral axis, and a vertical axis. |
| Device Type | Indicates the type of V2X device. Example: pedestrian, automobile, bicycle, etc. |

The V2X message transmitted by the V2X device 100 to the V2X server 200 is called an uplink (UL) V2X message, and the V2X message transmitted by the V2X server 200 to the V2X device 100 is called a downlink (DL) V2X message.

The V2X device 100 can include a processor 110 and a memory 120. The processor 110 implements the functions of the V2X device 100 and can include one or more software modules. The V2X device 100 can further include various additional devices according to functions such as a display, a user interface, and a wireless modem.

The V2X server 200 is connected to one or more base stations 310 and/or RSU 320 and includes computing hardware that provides V2X functions and V2X services to the V2X device 100. The V2X server 200 can be a Mobile/Multi-access Edge Computing (MEC)-based server or a centralized-based server. The V2X server 200 can be called another name, such as a Geocast server or a SoftV2X server. The V2X server 200 can include a processor 210 and a memory 220. The processor 210 implements the functions of the V2X server 200, and can include one or more software modules.

The processors 110 and 210 can include Application-Specific Integrated Circuits (ASICs), Central Processing Unit (CPU), Application Processor (AP), Digital Signal Processor (DSP), Digital Signal Processing Device (DSPD), Programmable Logic Device (PLD), Field Programmable Gate Array (FPGA), micro-controller, chipset, logic circuits, data processing device and/or combinations thereof. In the software implementation for the following embodiments, the software code for performing the functions described herein can be stored in the memories 120 and 220 and executed by the processors 110 and 210.

Memories 120 and 220 can store information accessible by processors 110 and 210. The information can include instructions executable by the processors 110 and 210 and/or data processed by the processor. Memories 120 and 220 can include any form of computer-readable medium operable to store information. For example, the memories 120 and 220 include read only memory (ROM), random access memory (RAM), digital video disc (DVD), optical disc, flash memory, solid state drive (SSD), hard drive and combinations thereof.

Figure 2:
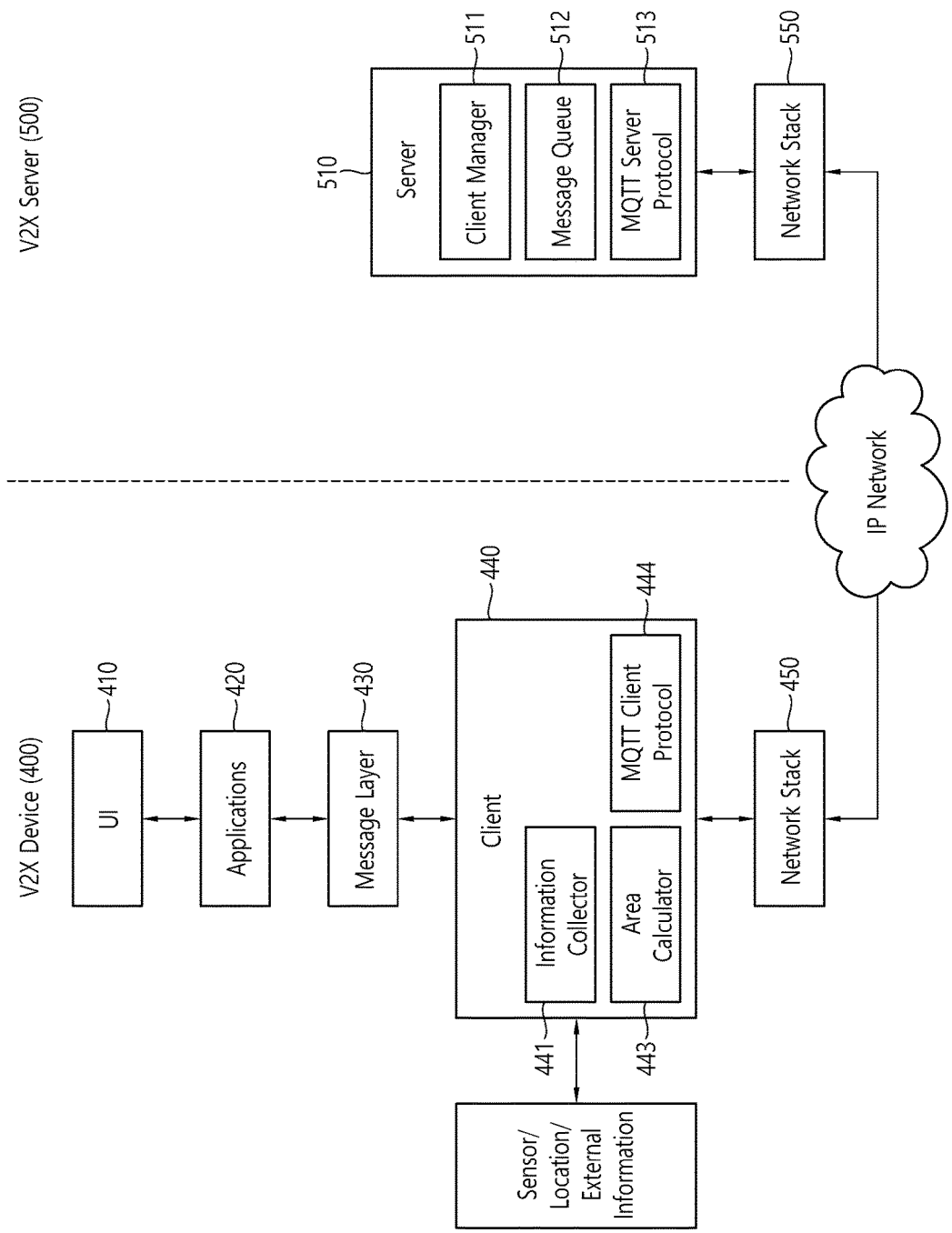
FIG. 2 shows an example of a system architecture of a V2X device and a V2X server according to an embodiment of the present specification.

FIG. 2 shows an example of a system architecture of a V2X device and a V2X server. Each module can be implemented in software, stored in a memory, and executed by a processor. Not all modules are required. Some modules can be omitted or modified, and more modules can be added. The name of each module is merely an example, not a limitation.

A V2X device 400 includes a user interface (UI) module 410, an application module 420, a message layer module 430, a client module 440, and a network stack module 450.

The UI module 410 can provide the user with a status of the V2X service, a warning, and the like, and receive a user input. The application module 420 can perform risk assessment using the received message. The message layer module 430 handles the sending/receiving of messages.

The client module 440 performs a client function to support the V2X service. The client module 440 includes an information collector 441, an area calculator 443, and a Message Queuing Telemetry Transport (MQTT) client protocol 444. The information collector 441 collects the location, sensor and/or external information of the V2X device 400. The area calculator 443 determines a subscription area in which the V2X message is received from the V2X server. The MQTT client protocol 444 implements the MQTT client protocol.

A V2X server 500 includes a server module 510 and a network stack module 550. The server module 510 performs a server function to support the V2X function. The server module 510 includes a client manager 511, a message queue 512, and an MQTT server protocol 513. The client manager 511 manages a client connected to the V2X server 500. The message queue 512 includes a queue for storing messages to be relayed to clients and manages messages. The MQTT server protocol 513 implements the MQTT server protocol.

The network stack modules 450 and 550 implement IP network interfaces, such as transmission control protocol/internet protocol (TCP/IP) and user datagram protocol/internet protocol (UDP/IP).

MQTT is used as a message queuing protocol, but this is only an example. Advanced Message Queuing Protocol (AMQP), HyperText Transfer Protocol (HTTP), and/or vendor specific protocols can be used.

Now, setting an area for V2X service will be described in more detail. Hereinafter, a tile refers to a geographic basic unit for setting a subscription area. Hereinafter, a rectangle is shown in the form of a tile, but it is only an example. There are no restrictions on the shape of the tile, such as polygons or circles.

Figure 3:
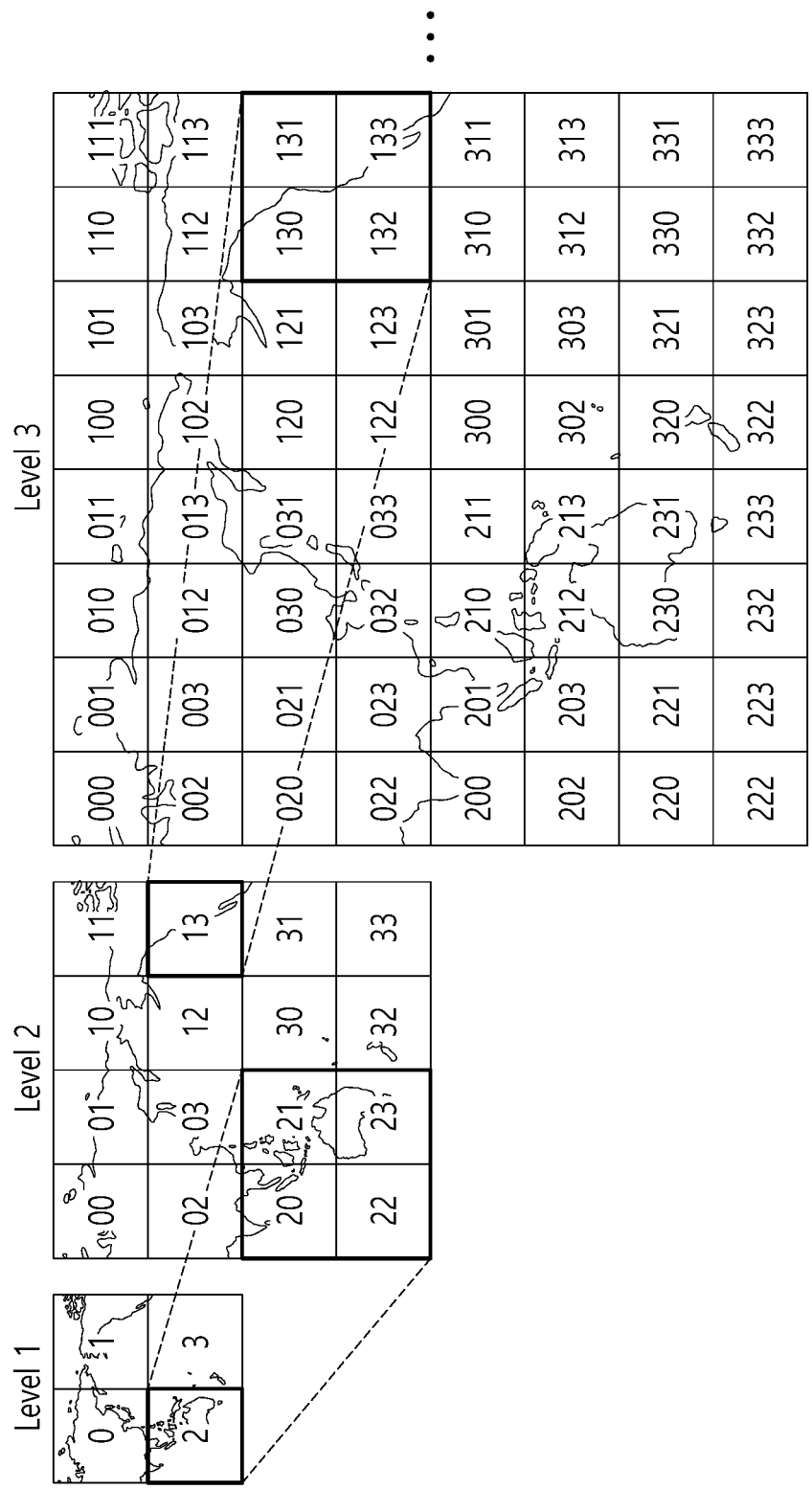
FIG. 3 shows an example of a tile using a quadtree according to an embodiment of the present specification.

FIG. 3 shows an example of a tile using a quadtree.

The quadtree represents a partition of space in two dimensions by decomposing a map (i.e., world map) into four equal quadrants, subquadrants, and so on. The size of a quadrant varies according to a zoom level, and each quadrant corresponds to a tile. Here, the case where the levels are 1, 2, and 3 is shown. The larger the level, the smaller the size of the tile. At each level, a unique ID is assigned to a tile. The tile ID can have the number of bits corresponding to the level. For example, each internal node in the quadtree can have four children.

The V2X device can acquire the ID of the tile in which the V2X device is located based on location information of the V2X device (e.g., latitude and longitude). The V2X device and/or the V2X server can adjust the size of the area by adjusting the level according to the situation.

In the following embodiment, the area for the V2X service is defined as follows.

Management area: The area managed by the V2X server. The management area includes one or more tiles.

Subscription area: The area where the V2X device requests a subscription to the V2X server. The subscription area can be referred to as another name, such as a concerned area, an impact area, or a geocast area. The subscription area contains one or more tiles. The subscription area can be included in one management area, and can be defined across a plurality of management areas managed by a plurality of V2X servers.

Publishing area: The area where the V2X device publishes V2X messages to the V2X server. The publishing area can include one tile in each level. The publishing area can indicate a tile where the V2X device is currently located. Some or all of the publishing area can overlap with the subscription area.

FIG. 4 shows an example in which a subscription area is set.

A first subscription area is set to the first V2X device 710 (e.g., the leftward sloping hashing around the person associated with first V2X device 710), and a second subscription area is set to the second V2X device 750 (e.g., the rightward sloping hashing around the vehicle associated with/corresponding to second V2X device 750). Each V2X device can set/change/delete the subscription area periodically or aperiodically (e.g., when its location is changed). Each V2X device can request setting/change/deletion of the subscription area to the V2X server.

In this example, the number of tiles included in the first subscription area is 9 and the number of tiles included in the second subscription area is 25, but the number of tiles included in the subscription area or the shape of the subscription area is not limited thereto. The subscription area can include a tile in which the V2X device is located.

Alternatively, the subscription area can include one or more tiles other than a tile in which the V2X device is located.

The V2X server can forward one or more V2X messages received in or around the subscription area to the V2X device corresponding to the subscription area. The V2X server delivers the V2X message received in the first subscription area to the first V2X device 710. The V2X server delivers the V2X message received in the second subscription area to the second V2X device 750. The V2X server can deliver a V2X message of which the publishing area belongs to the subscription area to the V2X device.

Each V2X device can receive a V2X message announced by other devices in and/or around the subscription area through the V2X server. The first V2X device 710 can generate a first V2X message and periodically send the first V2X message to the V2X server. The second V2X device 750 can generate a second V2X message and periodically send the second V2X message to the V2X server. Since the first V2X device 710 is located in the second subscription area, the V2X server can forward the first V2X message to the second V2X device 750. Since the second V2X device 750 is not located within the first subscription area, the V2X server does not forward the second V2X message to the first V2X device 710 (e.g., the person is in the vehicle's area so the vehicle can receive V2X messages from the person, but the vehicle is not in the person's area just yet so the person may not receive V2X messages from the vehicle). In other words, different areas or zones can be set for the first V2X device 710 and second V2X device 750, so that the second V2X device 750 is aware of the first V2X device 710, but the first V2X device 710 may not be aware of second V2X device 750, since the first V2X device 710 has a much smaller subscription area.

Figure 5:
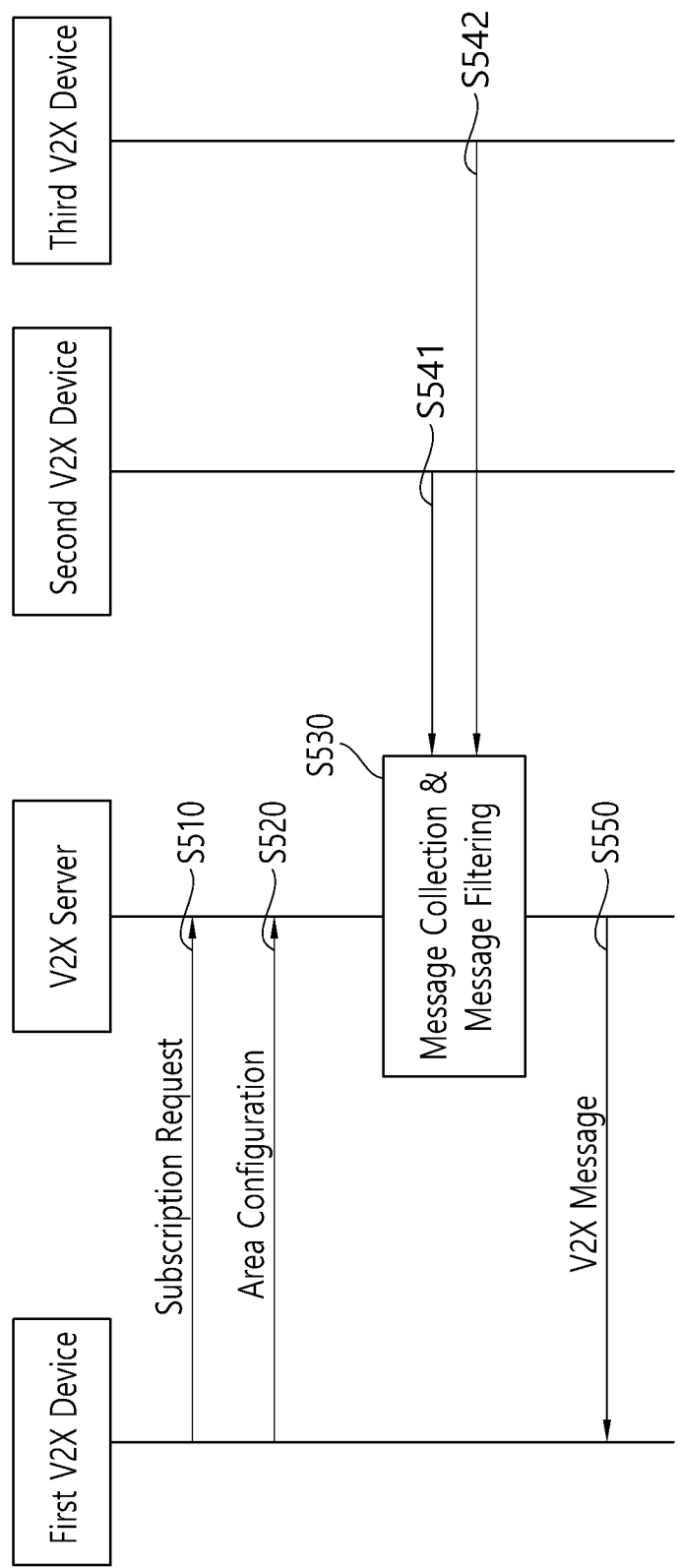
FIG. 5 is a flowchart illustrating a method for a V2X service according to an embodiment of the present specification.

FIG. 5 is a flowchart illustrating a method for a V2X service according to an embodiment of the present specification.

In step S510, a V2X device sends a subscription request for requesting subscription of the V2X service to a V2X server. The subscription request can include information about the identifier, location, etc. of the V2X device. The V2X server can transmit a subscription response for granting or rejecting subscription to the V2X device in response to the subscription request.

In step S520, the V2X device can send the area configuration related to the V2X service to the V2X server. The area configuration can be included in a separate message or included in the subscription request. The area configuration includes information about configuration and/or modification of the subscription area.

In step S530, the V2X server can collect V2X messages from V2X devices in the management area, and perform message filtering.

The V2X server receives the first V2X message from the second V2X device (step S541), and receives the second V2X message from the third V2X device (step S542). Assume that the second V2X device belongs to the subscription area of the first V2X device, but the third V2X device does not belong to the subscription area of the first V2X device.

In step S550, the V2X server publishes the first V2X message belonging to the subscription area of the first V2X device to the first V2X device. If there are a plurality of V2X messages to be sent to the first V2X device, the plurality of V2X messages can be announced separately or as a single message.

A device that sets a subscription area after completing the subscription request can be referred to as a "subscriber device." A device that transmits a V2X message to a V2X server can be called a "provider device." A V2X device can be a subscriber device, a provider device, or both a subscriber device and a provider device. The V2X server can forward the V2X messages transmitted by the provider devices in the management area to the subscriber device. In this example, the first V2X device is a subscriber device, and the second V2X device and the third V2X device are provider devices.

The V2X server can forward the V2X message transmitted by the provider device (referred to as a "subscribed provider device") related to the subscription area of the subscriber device to the subscriber device. In this example, the second V2X device is a subscribed provider device, but the third V2X device is not a subscribed provider device. This is because the V2X message of the third V2X device is not delivered to the first V2X device.

A subscribed provider device can be located within a subscription area of the subscriber device. The subscribed provider device transmits its own V2X message within the subscription area. Part or all of the publishing area of the subscribed provider device can overlap with the subscription area.

Although the provider device is not located in the subscription area, if the signal transmission range of the provider device overlaps the subscription area, it can be a subscribed provider device. The provider device is located outside the subscription area, but if the RSU or base station that receives the V2X message of the provider device is located in the subscription area, it can become a subscribed provider device.

A subscription area can be set for the provider device as a subscriber device as well. When the subscription area of the provider device and the subscription area of the subscriber device overlap in part or all, the provider device can become a subscribed provider device.

Message filtering is that V2X server filters the V2X messages to be transmitted to V2X devices that have completed the subscription request. Message filtering can be referred to as a process of selecting a subscribed provider device associated with a subscriber device among a plurality of provider devices. Filtering conditions can be defined differently depending on the subscription area and/or the state of the V2X device. For example, if the number of V2X devices in the subscription area is large, the filtering conditions can be modified so that more messages are filtered out.

Filtering conditions can be related to the degree of risk associated with a given V2X device (e.g., when many fast approaching vehicles are coming near a given smart phone user who is walking or riding a bicycle). There are many user devices or devices associated with users, such as pedestrians, vehicles, bicycles, and bikes in the subscription area, and the V2X server can calculate the degree of risk for each V2X device based on V2X messages received from other user devices located nearby or quickly approaching that V2X device. The V2X server can calculate the degree of risk by filtering unnecessary messages or information. For example, V2X messages between pedestrians can be filtered out. This is because it may not be necessary to evaluate the risk of collisions between pedestrians (e.g., the risk of two pedestrians walking into each other may be considered low in comparison to the risk of a fast approaching vehicle potentially running a pedestrian over). V2X messages of bicycles running at a slow speed can be filtered out. This is because it can be treated as a degree of risk identical to that of pedestrians. The V2X messages of vehicles residing in a delay/congestion area can be filtered out (e.g., vehicles stuck in traffic that are either not moving or moving at very slow speed), since there is little risk regarding collision or at least severe collisions. When the V2X device is located behind the decelerating vehicle, the V2X server can evaluate the situation and designate a high degree of risk (e.g., to help prevent a rear-end collision). When a V2X device enters a safe zone (e.g. a non-traffic zone), the V2X server can filter out most V2X messages unless there is an emergency. The V2X server can add or modify filtering conditions in consideration of the subscription area or the situation of the V2X device or the situation surrounding the V2X device.

Figure 6:
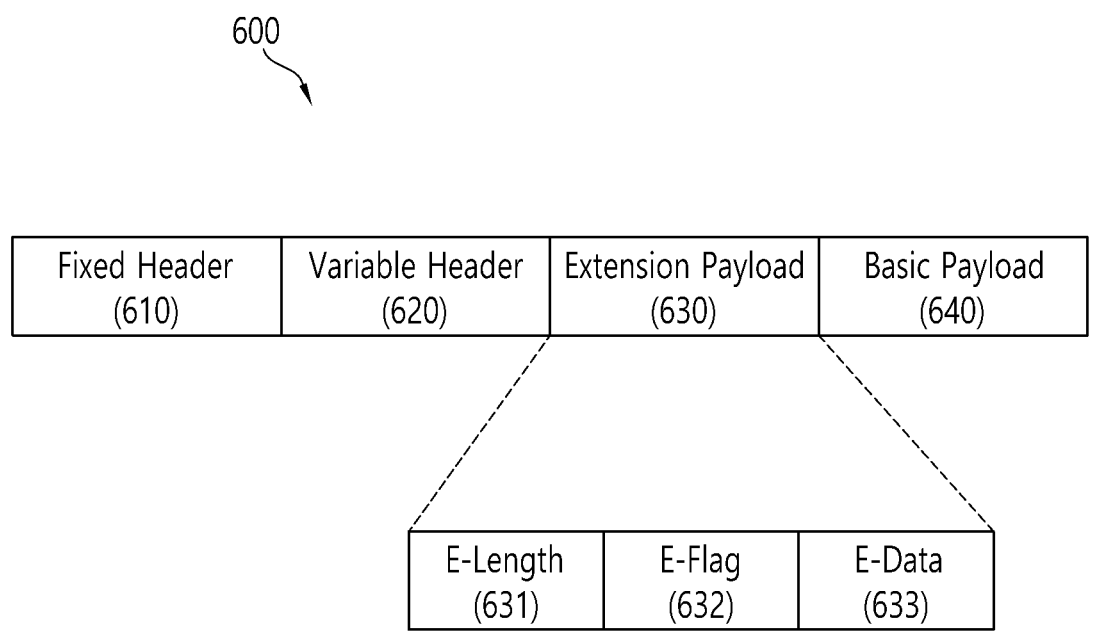
FIG. 6 shows a message format according to an embodiment of the present specification.

FIG. 6 shows a message format according to an embodiment of the present specification. MQTT protocol extension is used to add V2X function based on MQTT protocol.

A message 600 for subscription and announcement of V2X service includes a fixed header 610, a variable header 620, an extension payload 630 and a basic payload 640. The extension payload 630 includes an Extension (E)-length 631, an E-flag 632, and an E-data 633. The names and order of each field are merely examples. The E-length 631 represents the length of the extension payload 630. The E-flag 642 includes at least one of H (Heading), L (Location), V (Velocity), E (Event), ST (Sender Type)/RT (Receiver Type), and MT (Message Type).

Figure 7:
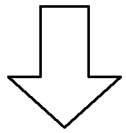
FIG. 7 shows an example in which a subscription area is changed according to an embodiment of the present specification.

FIG. 7 shows an example in which a subscription area is changed. The subscription area can be changed by the V2X device.

The V2X device located at tile 3000 sets 9 tiles 0333, 1222, 1223, 2111, 3000, 3001, 2113, 3002 and 3003 as the subscription area (e.g., a 3×3 area around the V2X device, centered on tile 3000).

As the V2X device moves to from tile 3000 to tile 0333, the V2X device establishes a new subscription area. The new subscription area includes tiles 0330, 0331, 1220, 0332, 0333, 1222, 2110, 2111 and 3000 (e.g., a 3×3 area centered on tile 0333).

There are no restrictions on how the subscription area can be changed and/or updated. In one embodiment, the V2X device can pre-define a reference tile (e.g., publishing tile) and the shape of the subscription area associated with the reference tile. In order to define the updated subscription area, the V2X device can provide information about the updated reference tile to the V2X server. In another embodiment, the V2X device can provide the V2X server with information about the difference between the previous subscription area and the updated subscription area. Information on tiles 0330, 0331, 1220, 0332, and 2110 to be newly subscribed and/or information about tiles 1223, 3001, 2113, 3002, and 3003 to be unsubscribed can be provided.

The V2X device can determine the size of the tile and/or the size of the subscription area in consideration of the state or speed of the V2X device. For example, a Level of Detail (LOD) of the tile can be determined as LOD=A−Round($\log_2$ (round((B*C)/D))). Here, A is the level of the quadtree, B is the speed of the V2X device, C is the amount of time the V2X device wants to stay or expects to stay in one tile, and D is the length of one side in one tile. The function round(x) returns a number rounded to the given number x.

When A=25, D=1.2 m, and LOD according to B and C is as follows.

TABLE 2

| Status of V2X device | B (m/sec) | C (sec) | LOD |
|---|---|---|---|
| Pedestrian - walking slowly | 0.83 | 10 | 22 |
| Pedestrian - walking normally | 1.11 | 10 | 21 |
| Pedestrian - walking fastly | 1.67 | 10 | 21 |

TABLE 2-continued

| Status of V2X device | B (m/sec) | C (sec) | LOD |
|---|---|---|---|
| Pedestrian - running slowly | 2.22 | 5 | 21 |
| Pedestrian - running fastly | 3.33 | 5 | 21 |
| Bicycle | 5.00 | 5 | 20 |
| Electronic Scooter | 6.94 | 5 | 20 |
| Automobile with low speed | 8.33 | 3 | 20 |
| Automobile in urban | 16.67 | 3 | 19 |
| Automobile in high way | 27.78 | 3 | 18 |
| Automobile with very fast speed | 41.67 | 3 | 18 |

Figure 8:
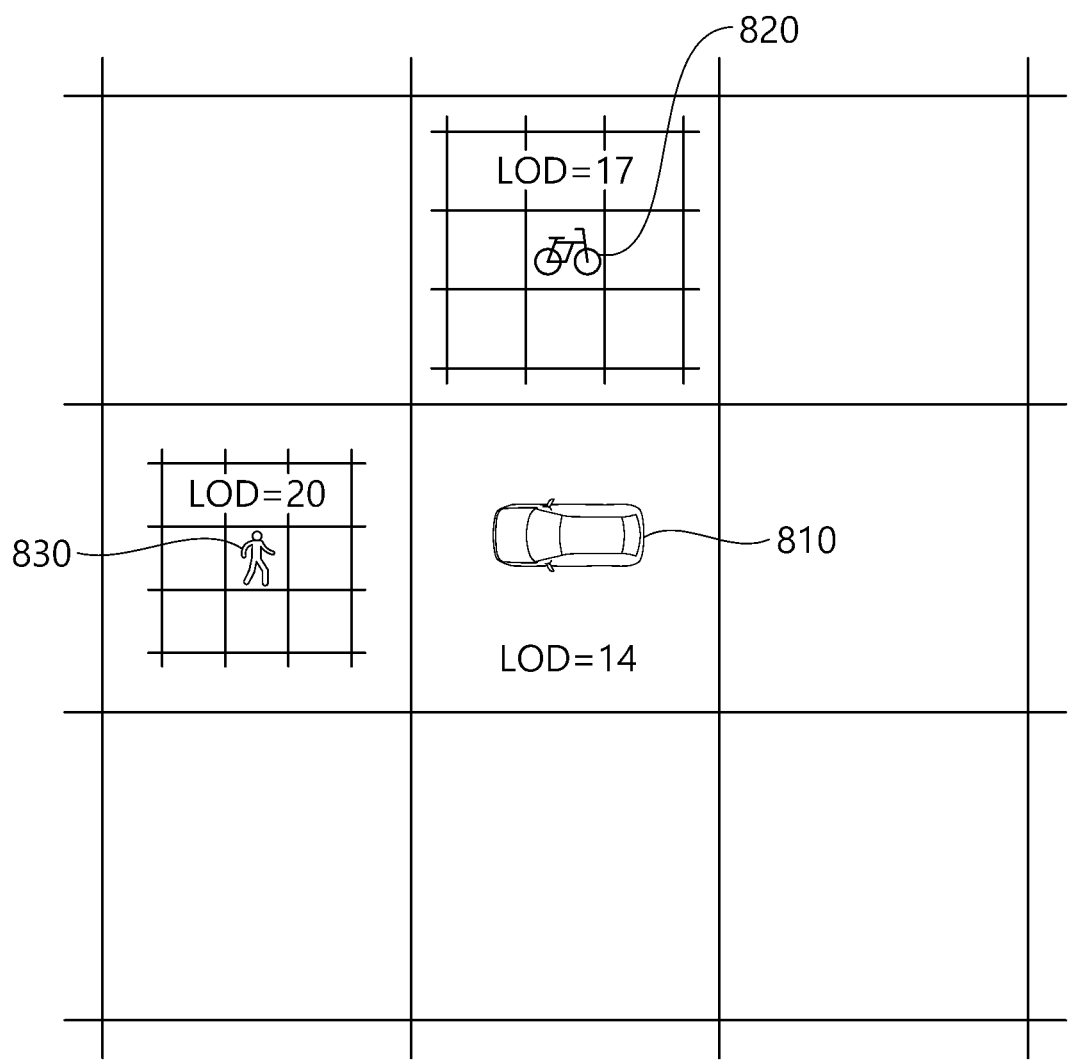
FIG. 8 shows an example in which the Level of Detail (LOD) is applied according to an embodiment of the present specification.

FIG. 8 shows an example in which the LOD is applied.

A vehicle 810, a bicycle 820, and a pedestrian 830 are considered as V2X devices or at least as users associated with a corresponding V2X device. It is assumed that the LOD of the vehicle 810 is 14, the LOD of the bicycle 820 is 17, and the LOD of the pedestrian 830 is 20. The size of the tile varies for each V2X device, and the size of the subscription area also varies. Assuming that the subscription area includes 9 tiles, the subscription area of the bicycle 820 and the pedestrian 830 completely overlaps the subscription area of the vehicle 810. Accordingly, the V2X message of the vehicle 810 is transmitted to the bicycle 820 and the pedestrian 830 through the V2X server. The subscription area of the bicycle 820 and the subscription area of the pedestrian 830 do not overlap. Therefore, the bicycle 820 and the pedestrian 830 do not exchange V2X messages with each other (e.g., due to their low speed and the separation distance, there is a low risk of collision between the bicycle 820 and the pedestrian 830).

By determining the LOD in consideration of the state of the V2X device, unnecessary message exchange can be reduced.

Figure 9:
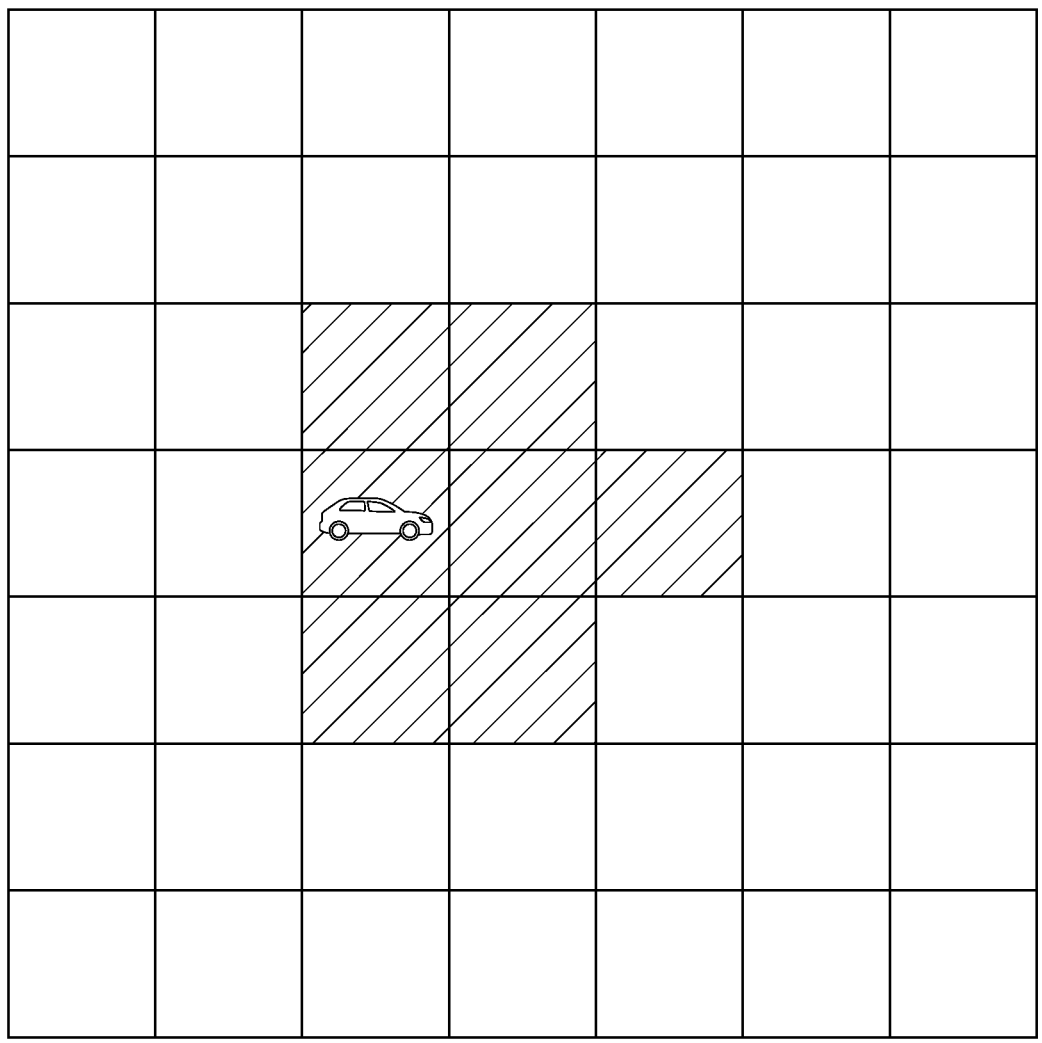
FIG. 9 shows an example in which a subscription area is set according to an embodiment of the present specification.

FIG. 9 shows an example in which a subscription area is set.

A subscription area can be determined according to the movement direction of the V2X device. Assume that a vehicle equipped with a V2X device drives at high speed from left to right. The subscription area does not include tiles located at the rear of the vehicle, but includes tiles located at the front of the vehicle. The higher the vehicle's speed, the greater the number of front tiles the subscription area can contain. Accordingly, the subscription area of a V2X device can automatically and dynamically change in proportion to the speed of the V2X device as well as the direction of the V2X device (e.g., if the vehicle stops moving forward and starts to drive in reverse).

Since the subscription area is set along the traveling direction of the vehicle, the vehicle can check the status of neighboring V2X devices (e.g., pedestrians, slow vehicles, etc.) located in the traveling direction in advance through a V2X message received from the V2X server.

Figure 10:
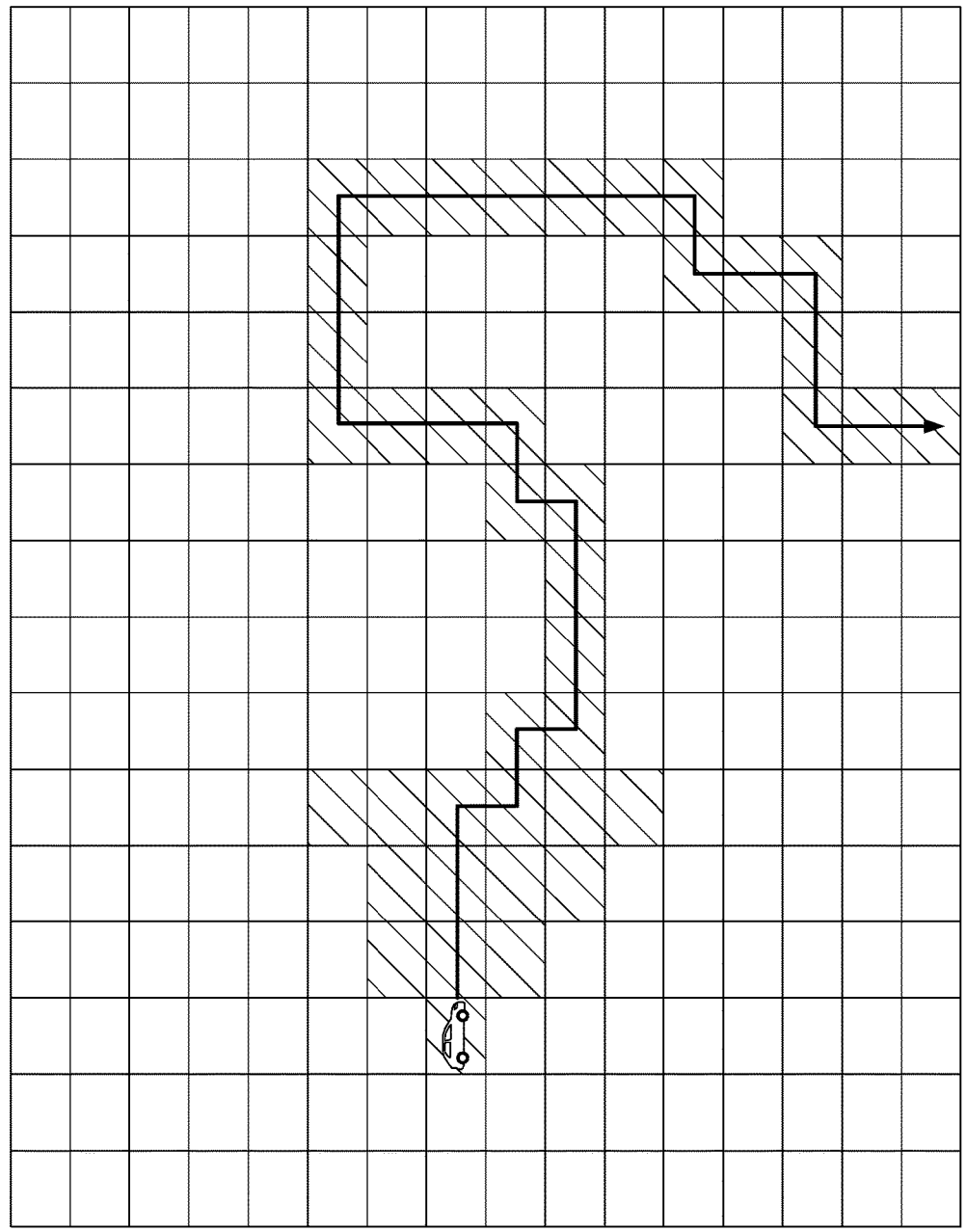
FIG. 10 shows another example in which a subscription area is set according to an embodiment of the present specification.

FIG. 10 shows another example in which a subscription area is set.

Assume that the route through which a V2X device travels is pre-specified (e.g., in a situation where a user designates a route via a GPS application ahead of time, before starting a journey, or in a situation where a vehicle's route is predicted, such as based on machine learning). Tiles on the route from the starting point to the destination point can be included in the subscription area. The V2X device can check the status of other devices located along the route in advance.

This can be useful for emergency vehicles such as fire trucks and ambulances (this emergency vehicle is equipped with a V2X device). Since the route of the emergency vehicle can be specified in advance, it is possible to notify the presence of the emergency vehicle to V2X devices located in the subscription area. The emergency vehicle can publish V2X messages not only on the tile where it is located but also on the surrounding tiles and the tiles located along or nearby the specified route. The V2X message can include information indicating an emergency vehicle. By announcing a V2X message in advance on a tile on the emergency vehicle's path, neighbor vehicles subscribing to this tile can clear the lane in advance.

The V2X server can notify in advance surrounding V2X devices located within the subscription area set by the emergency vehicle that the surrounding V2X devices are in the vicinity of the route of the emergency vehicle. Surrounding V2X devices can recognize the proximity of an emergency vehicle and can change lanes in advance, in order to get out of the emergency's vehicle's way and improve safety.

Figure 11:
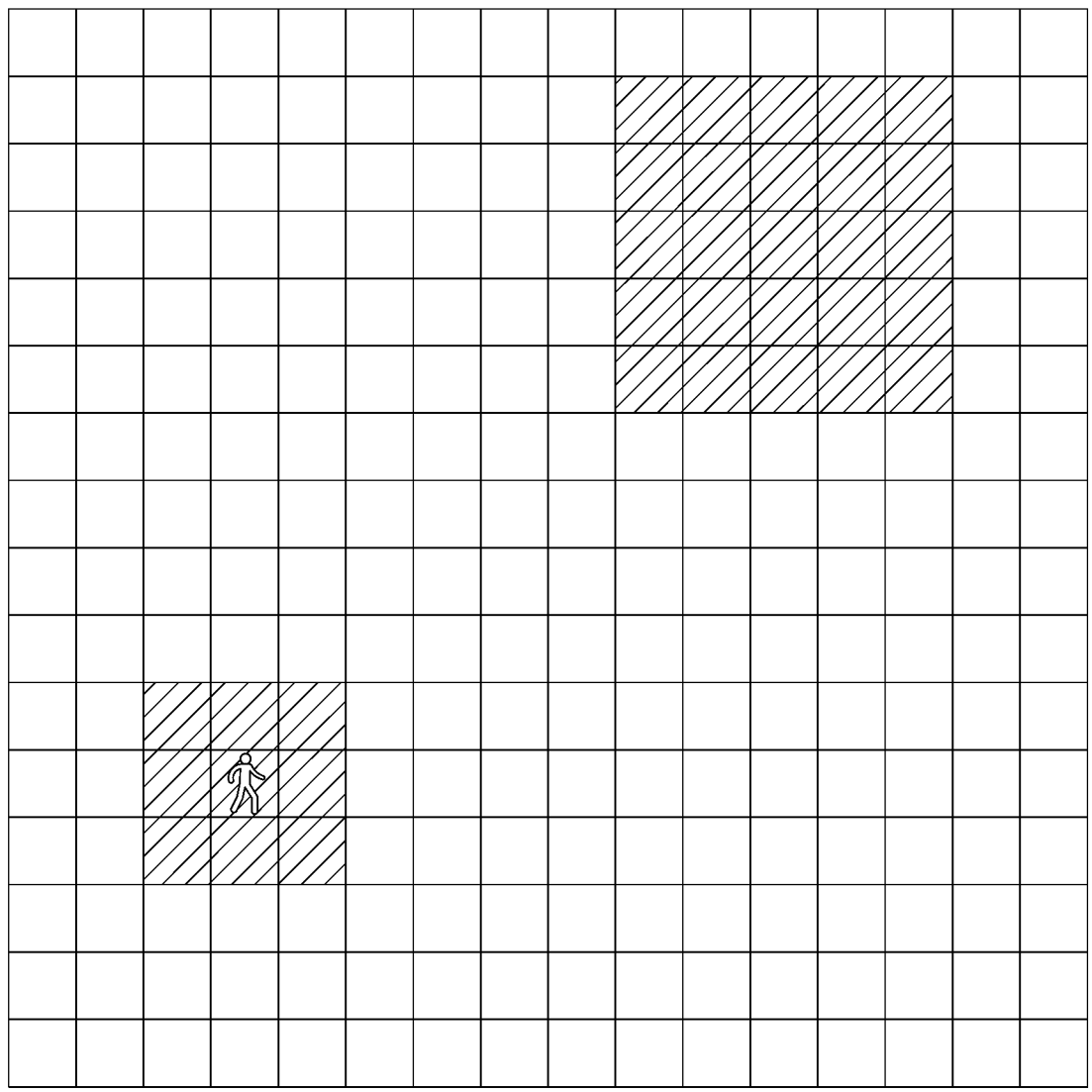
FIG. 11 shows another example in which a subscription area is set according to an embodiment of the present specification.

FIG. 11 shows another example in which a subscription area is set.

A subscription area can be configured not only around the V2X device, but also at an area located a relatively long distance away from the V2X device. For example, this is to predict the traffic situation in the area to be visited (e.g., in order to allow a user to plan ahead or anticipate a future parking situation or for safety concerns).

FIG. 12 shows another example in which a subscription area is set.

A V2X device configures a subscription area. Although a V2X server is not set up by the V2X device, additional subscription areas can be added by the V2X server. Considering the speed and direction of the V2X device, the V2X server can set up additional subscription areas. For example, if there is a specific event in the location where the V2X device will enter within a short time (e.g., road construction, icy area, accident prone area, nearby crime incident etc.), an additional subscription area can be configured. When the additional subscription area is configured, the V2X server can notify the V2X device. The V2X server forwards V2X messages received in the subscription area and the additional subscription area to the V2X device.

Figure 13:
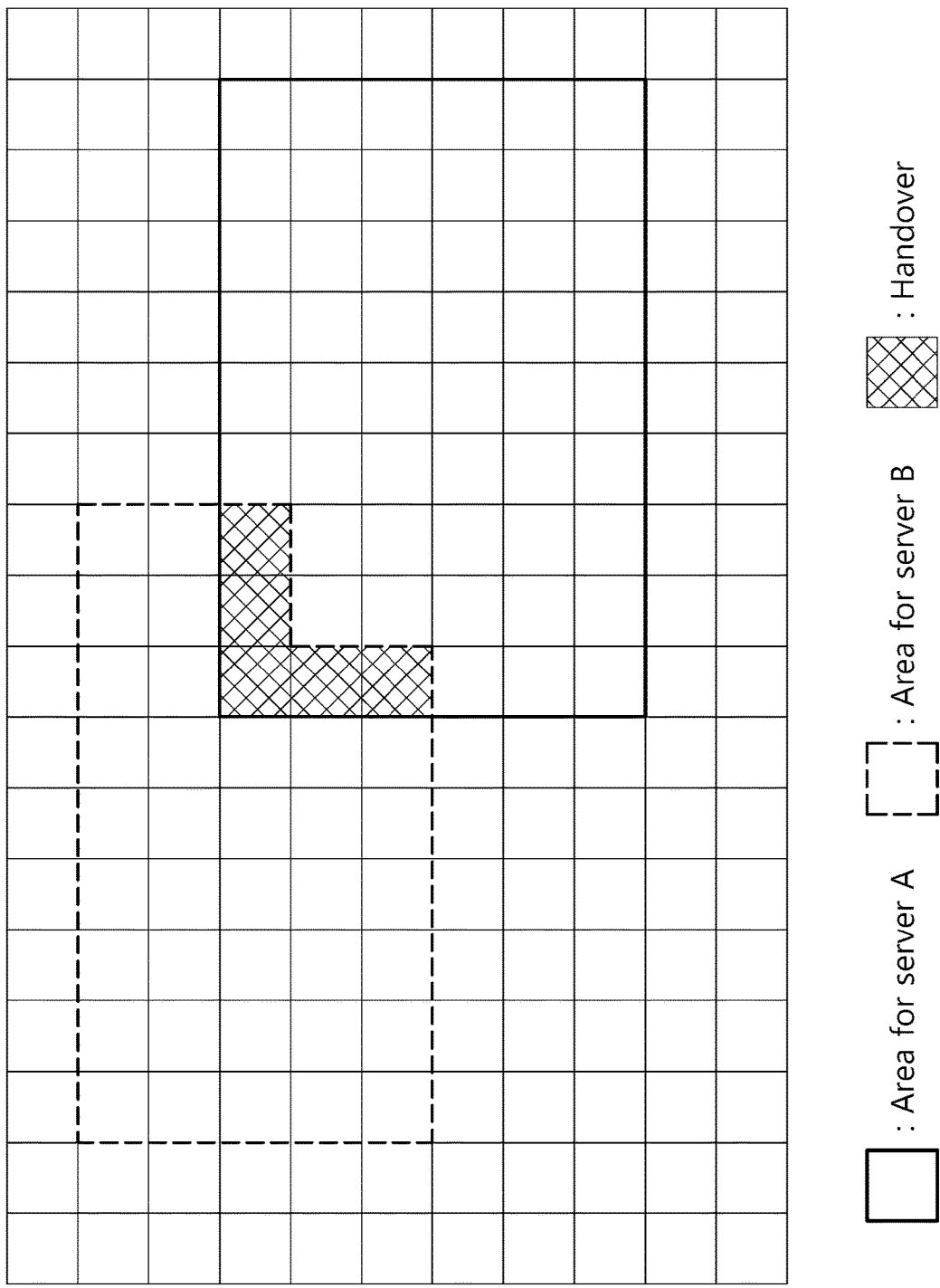
FIG. 13 shows an example of handover between V2X servers according to an embodiment of the present specification.

FIG. 13 shows an example of handover between V2X servers.

A large area can be controlled by a plurality of V2X servers. Server A can control management area A, and server B can control management area B. The subscription area of the V2X device can be configured across the management area A and the management area B. As the subscription area of the V2X device moves from the management area A to the management area B, handover information can be exchanged between servers. The handover information can include a subscription area for the V2X device.

A plurality of servers can divide and control an overloaded area. If the management area A is overloaded, the management area A is divided into two, so that the server A-1 and the server A-2 can control it respectively. When the overload is resolved, the divided areas can be merged and controlled as one server.

In the above examples, although the methods have been described based on the flowcharts using a series of the steps or blocks, the present disclosure is not limited to the sequence of the steps, and some of the steps can be performed at different sequences from the remaining steps or can be performed simultaneously with the remaining steps. Furthermore, those skilled in the art will understand that the steps shown in the flowcharts are not exclusive and can include other steps or one or more steps of the flowcharts can be deleted without affecting the scope of the present disclosure.

What is claimed is:

1. A device for vehicle-to-everything (V2X) service, the device comprising:
   a processor; and
   a memory operatively coupled with the processor and configured to store instructions that, when executed by the processor, cause the device to perform functions comprising:
   determining a size of a subscription area for the V2X service based on a speed of the device and an amount of time during which the device is expected to stay in one tile, the subscription area including at least one tile, each the at least one tile including a geographic quadrant obtained based on a quadtree;
   transmitting, to a V2X server, a subscription request for requesting a subscription of the V2X service, the subscription request including area configuration information about configuration or modification of the subscription area;
   receiving, from the V2X server, a subscription response for granting the subscription in response to the subscription request; and
   receiving, from the V2X server, at least one V2X message that is received by the V2X server from at least one provider V2X device, wherein the subscription area of the device overlaps with all or a part of a subscription area of each of the at least one provider V2X device.

2. The device of claim 1, wherein a size of the subscription area for the V2X service is determined periodically and the subscription request is transmitted upon the subscription area being changed.

3. The device of claim 1, wherein the at least one V2X message includes a V2X ID identifying the at least one provider V2X device and a position of the at least one provider V2X device.

4. The device of claim 1, wherein the device and the V2X server are configured to exchange messages based on Message Queuing Telemetry Transport (MQTT) protocol.

5. A method for vehicle-to-everything (V2X) service, the method performed by a V2X device and comprising:
   determining a size of a subscription area for the V2X service based on a speed of the V2X device and an amount of time during which the V2X device is expected to stay in one tile, the subscription area including at least one tile, each of the at least one tile including a geographic quadrant obtained based on a quadtree;
   transmitting, to a V2X server, a subscription request for requesting a subscription of the V2X service, the subscription request including area configuration information about configuration or modification of the subscription area;
   receiving, from the V2X server, a subscription response for granting the subscription in response to the subscription request; and
   receiving, from the V2X server, at least one V2X message that is received by the V2X server from at least one provider V2X device, wherein the subscription area of the V2X device overlaps with all or a part of a subscription area of each of the at least one provider V2X device.

6. The method of claim 5, wherein a size of the subscription area for the V2X service is determined periodically and the subscription request is transmitted upon the subscription area being changed.

7. The method of claim 5, wherein the at least one V2X message includes a V2X ID identifying the at least one provider V2X device and a position of the at least one provider V2X device.

8. The method of claim 5, wherein the V2X device and the V2X server are configured to exchange messages based on Message Queuing Telemetry Transport (MQTT) protocol.

\* \* \* \* \*